Patented Nov. 25, 1930

1,783,167

UNITED STATES PATENT OFFICE

HERMAN ALEXANDER BRUSON, OF GERMANTOWN, PENNSYLVANIA, ASSIGNOR TO THE RESINOUS PRODUCTS & CHEMICAL COMPANY, A CORPORATION OF DELAWARE

PREPARATION OF RUBBERLIKE MASSES

No Drawing.    Application filed July 8, 1930.   Serial No. 466,590.

This invention relates to complex condensation products of castor oil with acids such as sebacic acid, including aliphatic dibasic acids having the general formula

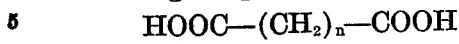

$$HOOC-(CH_2)_n-COOH$$

where $n$ is a whole number between 4 and 8 inclusive, and polyhydric alcohols containing at least three hydroxyl groups in the molecule. This application is a continuation in part of Serial No. 452,818 filed May 15th, 1930.

The object of this invention is to produce an artificial mass resembling natural Hevea rubber in that it is a very tough, soft, elastic solid capable of being stretched like rubber and of returning substantially to its original size and shape upon release of the tension. Another object of this invention is to produce a rubber-like mass which resembles natural rubber so closely that it may be worked upon a rubber mill and "broken down" by a mastication process analogous to that used in breaking down raw natural rubber, whereby the physical structure is so modified by the milling operation that greater solubility in organic solvents may be attained and solutions of lower viscosity prepared therefrom.

By the term "rubber-like elasticity" as referred to hereunder is meant the above-described property of resiliency and "snapback" which is characteristic of raw Hevea rubber, in contrast to the property of fluidity or ordinary plasticity characteristic of waxes or of ordinary resins.

I have found that if sebacic acid and/or other acids mentioned above are heated with glycerol in molecular proportions in the presence of castor oil, that an interesterification or condensation occurs between the three components whereby an elastic, rubber-like product is formed. Depending upon the kind and quantity of castor oil that is employed, products are obtained having widely different solubilities in organic solvents. By prolonged heating insoluble rubbery masses are obtained. These may be rendered soluble in organic solvents by milling upon rubber mills or paint mills with softening agents or organic liquids of the ether, ester, or ketone type. A break down of the molecular structure seems to occur and the products are then readily soluble in butyl acetate, toluene, acetone, glycol ethers, and the like.

In practicing my invention, preferably equimolecular proportions of sebacic acid and a polyhydric alcohol having at least three hydroxyl groups, are mixed with castor oil and heated with stirring at a temperature between 150° and 250° centigrade. The castor oil may be raw castor oil, or it may be blown castor oil, or heavy-body castor oil; and the quantity used can vary within wide limits, ranging from about 25% to 300% of the combined weight of the sebacic acid and the polyhydric alcohol. Ordinary dihydric alcohols such as ethylene glycol or diethylene glycol are inoperative in producing a rubber-like mass by the above reaction, but the polyhydric alcohols containing at least three hydroxyl groups, such as glycerol, mannitol, and the like are effective. However, dihydric alcohols may be added to the batch if desired in order to produce increased tackiness in the final rubbery mass. Linseed oil or other drying oils may be added to the mixture of sebacic acid, polyhydric alcohol and castor oil in order to produce a rubber-like mass which will dry to a non-tacky mass or film.

It is already known that polyhydric alcohols may be condensed with polybasic acids and castor oil to form resins. (Howell, U. S. Pat. 1,098,728 (1914); Weber, U. S. Pat. 1,690,515 (1928).) The prior art discloses phthalic, camphoric, cinnamic, citric, benzoic, maleic, tartaric, and succinic acids. The acids I employ are, however, unique in that when condensed as described herein, they yield rubber-like masses having greater elasticity, resiliency, and greater freedom from progressive embrittlement upon ageing or baking, than can be obtained by practicing the prior art. In addition, the rubber-like masses derived from them possess greater resistance to moisture and outdoor weathering conditions than the resins made according to the prior art. Moreover, the condensation products I prepare are unique in that they behave like natural rubber upon a rubber mill, where the shearing stresses produced break them down from an insoluble state to a soluble one. They may moreover be vulcanized with sulfur or sulfur compounds to yield products resembling vulcanized rubber.

The preparation of resins according to the prior art always involves considerable foaming, gas evolution, and losses of acid by sublimation. Acids of the type of sebacic acid are unique in that they do not cause foaming nor do they sublime appreciably during condensation. It is thus possible to produce products of greater uniformity of composition by working in open-mouth kettles to allow escape of the water vapor without fear of subliming out the acid.

The resins obtained by condensing these acids with glycerol and castor oil are, in their soluble state, capable of being blended directly with solutions containing nitro-cellulose or acetylcellulose. The insoluble types obtained by prolonged heating may be ground directly with nitro-cellulose and a suitable solvent such as butyl acetate upon rubber mills or paint grinders and thereby rendered soluble in and compatible with the nitro-cellulose. Such solutions are especially suited for leather lacquers as they possess good filling power, high gloss and excellent adhesion.

As examples of methods of preparing the rubber-like masses, the following are given:—

Example 1

64.4 parts of glycerol, 212 parts of sebacic acid, 166 parts of raw castor oil were heated in an open vessel fitted with a stirrer, to a temperature of 170–175° C. After about ten hours heating, a very tough, rubbery mass is formed which is fluid while hot. Upon cooling however, it forms a stiff jelly which is soluble in butyl acetate, acetone, ethyl acetate, glycol ethers, but is insoluble in ethyl alcohol, butanol or toluol.

By heating the mixture for about 16 hours the jelly becomes insoluble in all organic solvents. 100 parts of this insoluble material which forms a tough, rubbery mass when cold is ground in a paint grinder with 200 parts of butyl acetate. It forms a homogeneous solution, which upon evaporation deposits a tough, adherent rubbery film which is resilient and adherent.

Example 2

55 grams glycerol, 181.8 grams sebacic acid, 189.6 grams raw castor oil are heated in an open vessel with agitation at 190–200° C. After about ten hours a very rubbery product is obtained which differs from that obtained in Example 1 in being soluble in butanol and in toluene. If heated five or six hours longer it too forms a rubbery mass insoluble in all organic solvents, but capable of being masticated on a rubber mill to a completely soluble product as described above.

Example 3

55 grams glycerol, 181.8 grams sebacic acid, 189.6 grams blown (oxidized) castor oil. This mixture was heated 8 hours at 170–175° C. It gave a tough, rubber-like mass, soluble in butyl acetate, and butanol but insoluble in toluol or ethyl alcohol. When heated for a prolonged period of time it becomes insoluble in all organic solvents but behaves like natural rubber when broken down upon a rubber mill.

Example 4

46 grams glycerol, 151.5 grams sebacic acid, 197.5 grams castor oil, 49.5 grams raw linseed oil were heated with stirring in a stream of carbon dioxide at 185–190° C. for 18 hrs. The product was a rubbery mass soluble in toluol, butanol, butyl acetate, and glycol monethyl ether. The product dries to a tack-free rubbery film, compatible with nitro-cellulose.

Example 5

182 grams mannitol, 606 grams sebacic acid, 800 grams heavy-body castor oil were heated with stirring in an open kettle at 190–200° C. until a sample set to a firm gel. The product formed a very tough mass soluble in butyl acetate.

In place of sebacic acid certain other homologues lower in the series can be used in equivalent amount to obtain the same results, namely azelaic, suberic, adipic and pimelic acids. Sebacic acid is however, the most preferable.

Example 6

To prepare a rubber-like mass from azelaic acid, heat at 190–200° C. in an open kettle with stirring, a mixture of:—92 grams glycerol, 282 grams azelaic acid, 374 grams castor oil (raw). After about 15 hours heating, a rubbery mass soluble in butyl acetate is obtained. Upon further heating it becomes insoluble in all organic solvents but can be brought into solution by masticating upon steel rollers of a rubber mill with butyl acetate.

Example 7

The azelaic acid in Example 6 is replaced by 261 grams of suberic acid and the mixture is heated as above. A similar product is formed.

Example 8

The azelaic acid in Example 6 is replaced by 240 grams of pimelic acid and the mixture is heated as above. A rubber-like mass is formed.

Example 9

A mixture consisting of 438 grams adipic acid, 184 grams glycerol, and 622 grams raw castor oil is heated at 175° C. with stirring until a rubber-like mass soluble in butyl acetate is obtained. Further heating converts it into a rubber-like, insoluble product.

All of the aliphatic dibasic acids enumerated above in the various examples belong to a general class of acids having a normal, aliphatic chain of the formula $$HOOC-(CH_2)_n-COOH$$

wherein $n$ is a whole number between 4 and 8 inclusive.

In carrying out the above condensations it is advantageous in some cases to use higher temperatures. In all cases it is preferable to use the polyhydric alcohol in stochiometric proportions to the dibasic acid. In order to check the condensation at high temperatures for the purpose of obtaining a soluble product, a suitable organic solvent such as butyl acetate, butanol, or toluol may be added. This immediately lowers the temperature of the mass so that further condensation ceases and the rubber mass readily goes into solution.

For many purposes it is desirable to use these rubbery products admixed with linseed oil or other drying oils. Since the rubbery masses produced above are not readily soluble in oils, they are best incorporated in such oil by adding the oil to the batch during the condensation process or by heating the oil and the rubbery mass until solution occurs.

As an example of this process, the following gives a typical illustration:

A mixture consisting of 46 parts glycerol, 151.5 parts sebacic acid, 150 parts raw castor oil, and 70 parts raw linseed oil are heated about 12 hours at 185–195° C. until a sample sets to a firm gel upon cooling. A tough rubber-like mass is obtained which is soluble in butyl acetate, butyl alcohol, glycol monoethyl ether, and acetone. It is practically insoluble in toluene or ethyl alcohol.

All of the above described rubber-like products may find practical uses in nitrocellulose or other cellulosic lacquers as plasticizers. They give excellent adhesion and flexibility to such plasticized films and are especially suitable as coating materials either alone or in conjunction with nitro-cellulose for coating leather, paper, rubber and other porous materials. The rubbery products may be used also as adhesives or bonding materials for rubber, asbestos, clay, pigments, wood flour and the like.

What I claim is:

1. A composition of matter comprising the reaction product of castor oil, glycerol, and sebacic acid.

2. A composition of matter comprising the reaction products of castor oil, glyceral and adipic acid.

3. Composition of matter comprising the reaction product of castor oil, glyceral, and azelaic acid.

4. Composition of matter comprising the reaction product of castor oil, glycerol, and an aliphatic dibasic acid having the general formula $HOOC-(CH_2)_n-COOH$ where $n$ is a whole number between 4 and 8 inclusive.

5. Composition of matter comprising the reaction product of castor oil, a polyhydric alcohol having over two hydroxyl groups, and sebacic acid.

6. A composition of matter comprising the reaction product of castor oil, a polyhydric alcohol having over two hydroxyl groups, and an aliphatic dibasic acid having the general formula $HOOC-(CH_2)_n-COOH$ where $n$ is a whole number between 4 and 8 inclusive.

7. A composition of matter comprising the reaction product of castor oil, a polyhydric alcohol having over two hydroxyl groups, and adipic acid.

8. A composition of matter comprising the reaction product of castor oil, a polyhydric alcohol having over two hydroxyl groups, and azelaic acid.

9. A composition of matter comprising the reaction product of castor oil, a polyhydric alcohol having over two hydroxyl groups, an aliphatic dibasic acid of the general formula $HOOC-(CH_2)_n-COOH$ where $n$ is a whole number between 4 and 8 inclusive, and a drying oil.

10. A composition of matter comprising the reaction product of castor oil, a polyhydric alcohol having over two hydroxyl groups, an aliphatic dibasic acid of the general formula $HOOC-(CH_2)_n-COOH$ where $n$ is a whole number between 4 and 8 inclusive, and linseed oil.

11. A composition of matter comprising the reaction product of castor oil, glycerol, sebacic acid, and a drying oil.

12. A composition of matter comprising a reaction product of castor oil, glycerol, sebacic acid, and linseed oil.

13. A composition of matter comprising the reaction product of castor oil, glycerol, adipic acid, and linseed oil.

14. A composition of matter comprising the reaction product of castor oil, glycerol, adipic acid, and a drying oil.

15. Process of producing a rubber-like mass which comprises heating to reaction temperature castor oil, a polyhydric alcohol having over two hydroxyl groups, an aliphatic dibasic acid of the general formula $$HOOC-(CH_2)_n-COOH$$

where $n$ is a whole number between 4 and 8 inclusive, and a drying oil.

16. Process of preparing a rubber-like mass which comprises heating to reaction temperature castor oil, glycerol, sebacic acid, and linseed oil.

17. Process of preparing a rubber-like mass which comprises heating to reaction temperature castor oil, a polyhydric alcohol having over two hydroxyl groups, and an aliphatic dibasic acid having the general formula $$HOOC—(CH_2)_n—COOH$$

where $n$ is a whole number between 4 and 8 inclusive.

18. A composition of matter comprising the reaction product of castor oil, a polyhydric alcohol having over two hydroxyl groups, and an aliphatic dibasic acid having the general formula $$(CH_2)_n\!\!\diagdown_{COOH}^{COOH}$$

where $n$ is a whole number between 4 and 8 inclusive, and a dihydric alcohol.

In testimony whereof I affix my signature.
HERMAN A. BRUSON.

CERTIFICATE OF CORRECTION.

Patent No. 1,783,167. Granted November 25, 1930, to

HERMAN ALEXANDER BRUSON.

It is hereby certified that error appears in the printed specification of the above numbered patent requiring correction as follows: Page 3, lines 60 and 63, claims 2 and 3, respectively, for the misspelled word "glyceral" read glycerol; and that the said Letters Patent should be read with these corrections that the same may conform to the record of the case in the Patent Office.

Signed and sealed this 13th day of January, A. D. 1931.

(Seal)

M. J. Moore,
Acting Commissioner of Patents.

DISCLAIMER 1,783,167.—*Herman Alexander Bruson*, Germantown, Pa. PREPARATION OF RUBBERLIKE MASSES. Patent dated November 25, 1930. Disclaimer filed April 27, 1934, by the patentee, the assignee, *The Resinous Products & Chemical Company*, approving.

Hereby enters disclaimer to the following parts of the specification and claims:
Page 1, lines 61 and 62, "or it may be blown castor oil".
Example 3, reading as follows:

"55 grams glycerol, 181.8 grams sebacic acid, 189.6 grams blown (oxidized) castor oil. This mixture was heated 8 hours at 170–175° C. It gave a tough, rubberlike mass, soluble in butyl acetate, and butanol but insoluble in toluol or ethyl alcohol. When heated for a prolonged period of time it becomes insoluble in all organic solvents but behaves like natural rubber when broken down upon a rubber mill."

Your petitioner also enters disclaimer of blown castor oil insofar as it might be included in the term "castor oil" used in the claims.

[*Official Gazette May 29, 1934.*]

DISCLAIMER 1,783,167.—*Herman Alexander Bruson*, Germantown, Pa. PREPARATION OF RUBBER-LIKE MASSES. Patent dated November 25, 1930. Disclaimer filed October 18, 1934, by the patentee, and the assignee, *The Resinous Products & Chemical Company*, approving.

Hereby enters disclaimer to the following parts of the specification and claims, namely:

1. Claims 2, 7, 13, 14.
2. Claims 4, 6, 9, 10 except where in the formula, $n$ is a whole number between 5 and 8, inclusive.

[*Official Gazette November 13, 1934.*]